T. J. BURKE.
ANIMAL TRAP.
APPLICATION FILED MAR. 13, 1911.
1,004,985.
Patented Oct. 3, 1911.
3 SHEETS—SHEET 1.
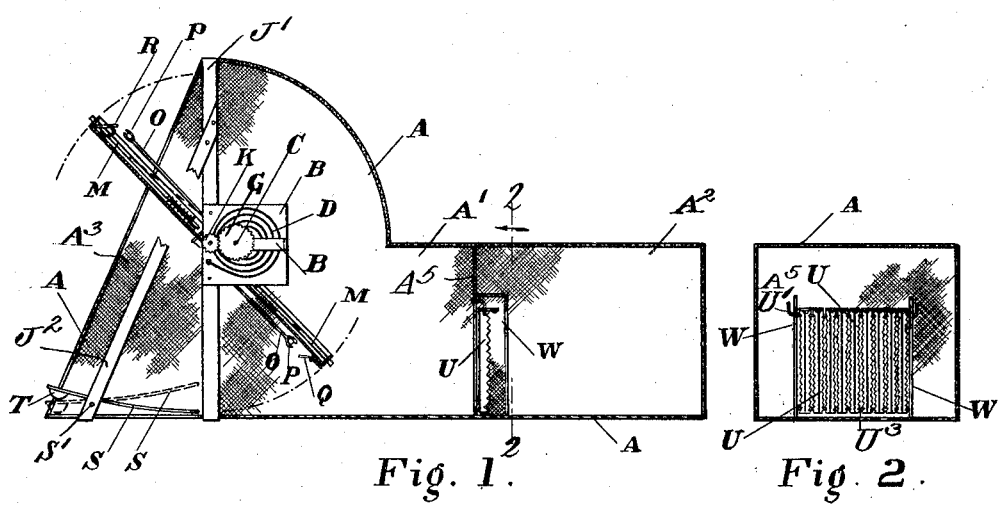
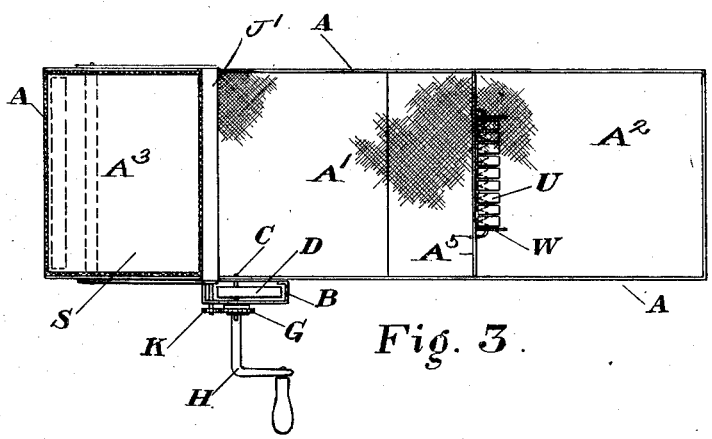
WITNESSES
INVENTOR
Thomas J. Burke
BY
ATTORNEY

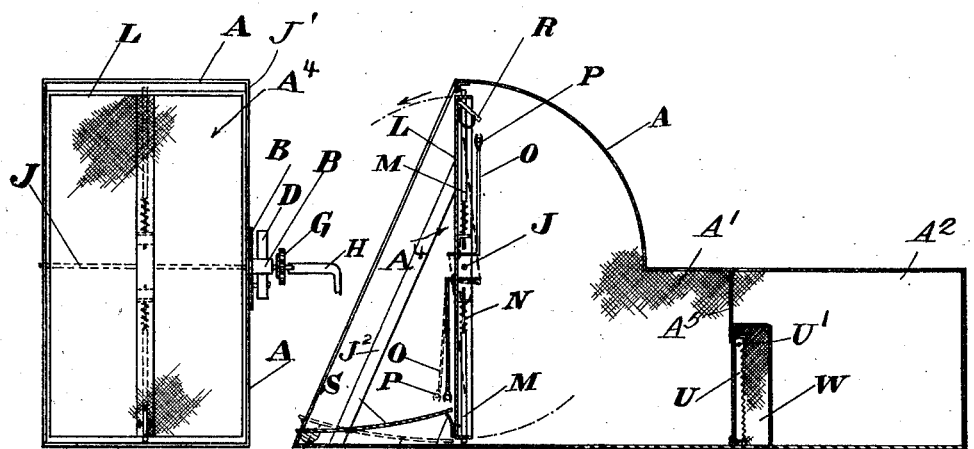
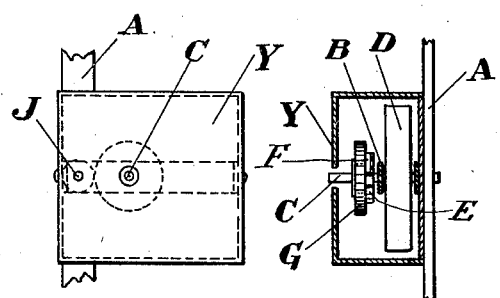
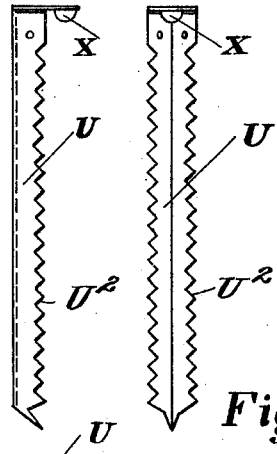

T. J. BURKE.
ANIMAL TRAP.
APPLICATION FILED MAR. 13, 1911.
1,004,985.
Patented Oct. 3, 1911.
3 SHEETS—SHEET 3.
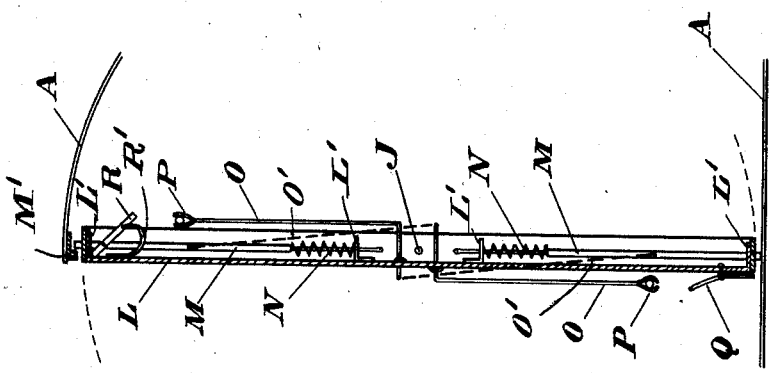
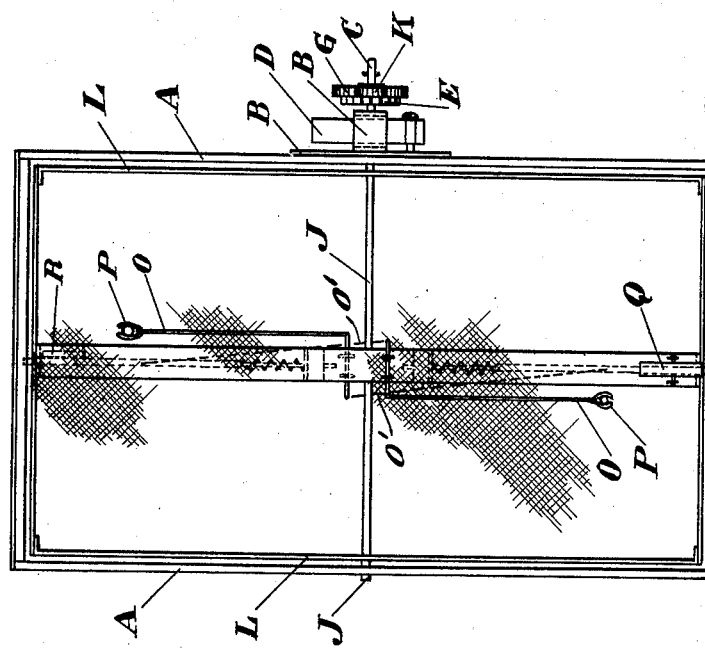
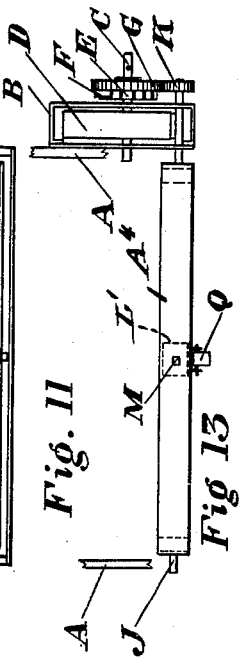
WITNESSES:
INVENTOR.
Thomas J. Burke
BY
ATTORNEY.

UNITED STATES PATENT OFFICE.

THOMAS J. BURKE, OF NEW ORLEANS, LOUISIANA.

ANIMAL-TRAP.

1,004,985.   Specification of Letters Patent.   Patented Oct. 3, 1911.

Application filed March 13, 1911. Serial No. 614,178.

*To all whom it may concern:*

Be it known that I, THOMAS J. BURKE, a citizen of the United States, residing at New Orleans, in the parish of Orleans and State of Louisiana, have invented new and useful Improvements in Animal-Traps, of which the following is a specification.

This invention relates to improvements in animal traps of that type which embodies a casing and a revoluble door or its equivalent normally closing the entrance to the casing and operable, when released, to forcibly throw or push an animal through the said entrance.

The object of the invention is to provide a trap of the general type referred to which shall embody improvements in respect to a number of details of structure and arrangement to be hereafter specified, for the purposes of certainty and efficiency of operation.

An embodiment of the invention is illustrated by way of example in the accompanying drawings, wherein—

Figure 1 is a vertical longitudinal section, partly in elevation, of an improved trap in accordance with the present invention; Fig. 2 is a cross section on the line 2—2 of Fig. 1; Fig. 3 is a top plan view partly in section; Fig. 4 is a front elevation; Fig. 5 is a vertical longitudinal section in a different plane from Fig. 1; Fig. 6 is a detail elevation showing the gearing for operating the revoluble door; Fig. 7 is a detail sectional view of the same; Fig. 8 is a detail side elevation of one of the members of the closure between the chambers of the casing; Fig. 9 is a detail rear elevation thereof; Fig. 10 is a detail plan view thereof; Fig. 11 is a detail elevation of the revoluble door; Fig. 12 is a vertical central sectional view thereof; and Fig. 13 is a top plan view thereof.

Similar characters of reference designate corresponding parts throughout the several views.

The casing to which reference has been made is designated by the letter A and includes the front and rear chambers A' and A² and an entrance A³ communicating with the chamber A'. The entrance is normally closed by a revoluble door A⁴ which is held against movement by suitable latch mechanism and is operated by gearing. The gearing for operating the door is arranged exteriorly of the casing and is supported by a side wall thereof and by a bracket B attached to said side wall. The main shaft of this gearing is indicated by the letter C and has attached thereto one end of a coil spring D, the other end of said spring being fixed to a stud or pin which projects inwardly from the bracket B. The shaft C has fixed thereon a ratchet wheel E which engages a pawl F carried by a pinion G which is loose in said shaft. The frame of the door A⁴ is fixed on a shaft J, which is journaled in a frame J' surrounding and fixed to the casing and employed to give strength and stability to the construction. The shaft J passes through the bracket B, having additional support thereby and is provided on its outer end with a pinion K which gears with the pinion G. The shaft C has a projecting end which is formed to engage in a crank handle H employed to rewind the spring.

The door A⁴ has arranged longitudinally central thereof and supported between the end bars of its frame, a channel bar L through which the shaft J passes and which carries upper and lower latch pins M. The pins M works through guide lugs L' provided on the bar L and are forced outwardly by springs N, their outer ends engaging against a lip M' arranged centrally at the upper edge of the casing A.

The means for retracting the pins M against the tension of their springs N comprises levers O and cords or links O' connecting angular extensions of said levers and corresponding pins M. The levers O are pivotally mounted at opposite sides of the bar L in eyes or equivalent bearings and extend in opposite directions, each lever having at its outer end a clip P for the purpose of holding the bait. In the present construction the lever O which happens to occupy a depending position is connected by its cord or link O' with the pin M which happens to be uppermost and the said cords or links maintain the proper relation of said levers.

The entrance A³ is provided with a platform S which is pivoted at S' to braces J² which are connected to the frame J'. The bar L is provided at each end with a device for normally supporting the platform S in an elevated position. The device which is mounted on the channel side of said bar consists of a pivoted finger R pressed outwardly by a spring R' and the device which is mounted at the opposite end of and on the flat side of said bar consists of a pivoted finger Q slightly weighted at its lower end.

The partition $A^5$ which separates the chambers of the casing has an opening of suitable size to provide for the easy passage of an animal from the chamber $A'$ to the chamber $A^2$. This opening is normally covered by a closure which is so constructed as to prevent the animals in the chamber $A^2$ from passing to the chamber $A'$. This closure preferably consists of a suitable number of elements U shown in detail in Figs. 8, 9 and 10. The elements U have a V-shaped cross section and are pivotally pendent from a supporting rod $U'$. Said elements U are closely associated, presenting their apices to the opening in the partition $A^5$ and having their rear edges preferably provided with serrations $U^2$. The elements U may be mounted for individual swinging movement on the rod $U'$ or they may be connected at their lower ends by a rod $U^3$ so as to swing as a series. At each end of the series of elements U side plates or screens W may be and preferably are provided. Each element U has at its upper end a rearward extension carrying a counterweight X. It will be apparent that an animal thrown or pushed into the chamber $A'$ will naturally enter the chamber $A^2$. As the animal encounters the elements U these will be forced rearwardly and upwardly and as soon as the animal has passed thereby they will drop to their normal positions and thus prevent the animal trapped in the chamber $A^2$ from passing back to the chamber $A'$.

In operation the door $A^4$ is disposed, for example, as shown in Fig. 5 wherein the platform S is supported in a raised position by the finger Q. As an animal approaches the trap it will come upon the platform S and will upon taking the bait swing the lever O outwardly, and thereby through the agency of the connection $O'$ produce an inward movement of the then upper latch pin M whereupon the spring D will be effective to swing the door in the direction indicated by the arrow, such swinging movement being limited by the engagement of the other latch pin M against the lip $M'$. As the door is thus swung the platform S is first disengaged by the finger Q and, owing to the weight of the animal thereon, said platform will drop, thus giving the animal an initial impetus into the chamber $A'$. At very nearly the same instant the then lower portion of the door $A^4$ will strike the animal and forcibly throw or push it into the said chamber $A'$. As soon as the animal leaves the platform S the counterweight T at the forward end of the latter will raise said platform and as the door approaches the limit of its swinging movement the pin R will yield on its pivot in passing by the adjacent edge of the platform S and engage under said platform thereby supporting the latter in the same manner as the pin Q which has a similar action on the following operation of the door. The normal position of the door is indicated in Fig. 5 and the relation of the parts during the operation of the device is indicated in Fig. 1.

It will be seen from the foregoing description that the trap herein proposed is certain and efficient in its operation, the action of the revoluble door being so quick as to prevent the escape of the animal and such action being facilitated by the action of the dropping platform S. The latch pins and their adjuncts are of such nature that a comparatively slight pull is required to release the door and consequently the action of the device is of sensitive character.

In order to protect the door operating gearing from dust and the elements it is preferred to inclose said gearing in a casing Y (Figs. 6 and 7).

While the improvement has been termed an animal trap it will be understood that it may be used under water for trapping water animals or even for trapping certain kinds of fish.

Having fully described my invention, I claim:

1. In an animal trap, in combination, a casing, a door arranged to close the entrance thereof, a transverse shaft carrying the door and arranged centrally of the height of the latter, a pivoted platform arranged adjacent the entrance of the casing in advance of the door and adapted to drop under the weight of an animal thereon, the door having yielding fingers which engage under and normally support the platform, the casing having a lip, latch pins arranged to normally engage the lip, connections for releasing the latch pins, and means for turning the door through a half revolution when the latch pins are released.

2. In an animal trap, in combination, a casing having a partition forming two chambers, the partition having an opening to provide for the passage of an animal from one chamber to the other, a door normally closing the entrance to the forward chamber and automatically operable to provide for trapping an animal in said forward chamber, and a closure for the opening in the partition, the closure consisting of a series of pivotally pendent elements each having a V-shaped cross section and presenting its apex to said opening, the said elements having their rear edges serrated.

3. In an animal trap, in combination, a casing, a door arranged to close the entrance thereof, and movable on a horizontal axis, a pivoted platform arranged adjacent the entrance of the casing in advance of the door and adapted to drop under the weight of an animal thereon immediately that the door commences its movement to open the entrance of the casing, door latching means including a bait holding element which is operable by the animal to release the door, and means for effecting an operative movement of the door when the latter is released by its latching means.

In testimony whereof I have hereunto set my hand in presence of two subscribing witnesses.

THOMAS J. BURKE.

Witnesses:
 PATRICK J. FALLON,
 J. McG. PATTERSON.

Copies of this patent may be obtained for five cents each, by addressing the "Commissioner of Patents, Washington, D. C."